G. WALLACE.
PIPE CUTTING MACHINE.
APPLICATION FILED JAN. 17, 1913.
1,111,336.
Patented Sept. 22, 1914.
2 SHEETS—SHEET 2.
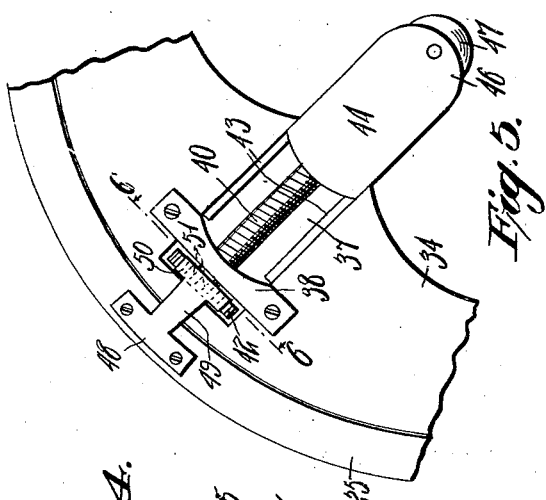
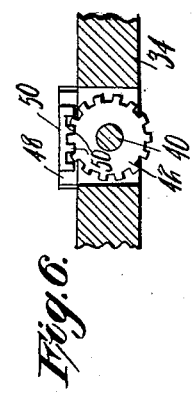
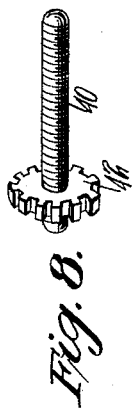
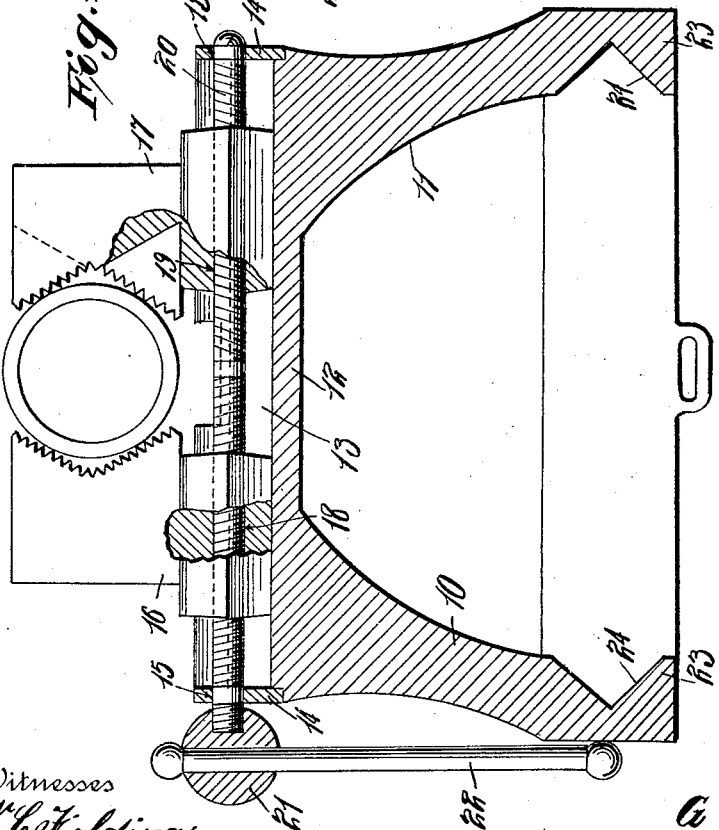
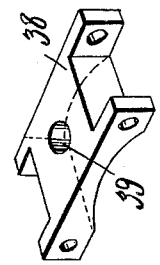

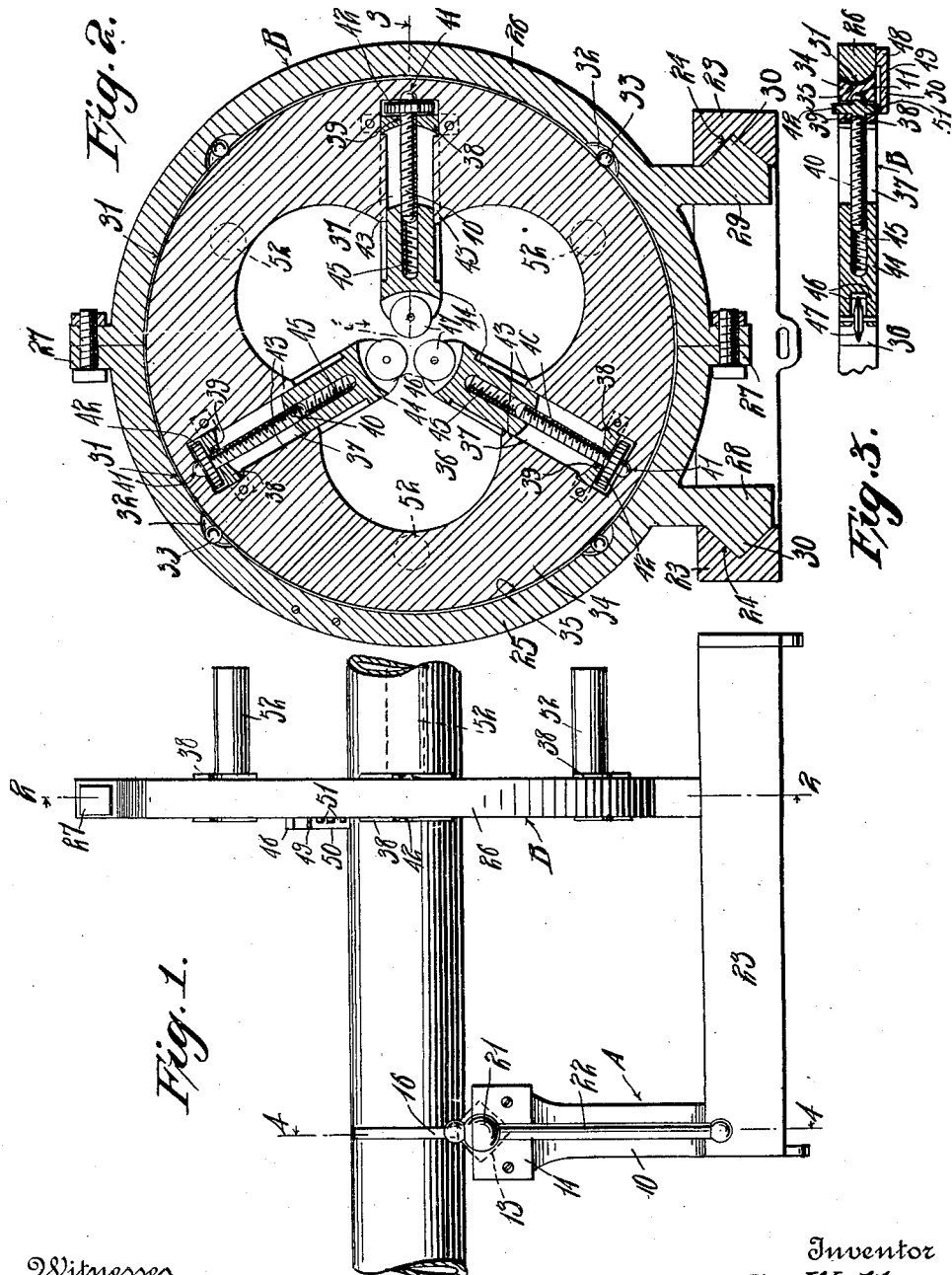

UNITED STATES PATENT OFFICE.

GEORGE WALLACE, OF NIAGARA FALLS, NEW YORK.

PIPE-CUTTING MACHINE.

1,111,336.  Specification of Letters Patent.  Patented Sept. 22, 1914.

Application filed January 17, 1913. Serial No. 742,717.

*To all whom it may concern:*

Be it known that I, GEORGE WALLACE, a citizen of the United States, residing at Niagara Falls, in the county of Niagara, State of New York, have invented certain new and useful Improvements in Pipe-Cutting Machines; and I do hereby declare the following to be a full, clear, and exact description of the invention, such as will enable others skilled in the art to which it appertains to make and use the same.

This invention relates to pipe cutting machines.

The object of the invention resides in the provision of a pipe cutting machine which includes means for supporting a pipe and a rotatable cutter head in which the cutters are mounted for movement radially of the head and adapted to be automatically fed to the work as said head is rotated.

A further object of the invention resides in the provision of a machine of the type named which will be simple in construction, efficient and reliable in use and which may be manufactured at comparatively small cost.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a side elevation of a machine constructed in accordance with the invention and showing a pipe supported thereby and the cutting mechanism disposed in operative relation to the pipe; Fig. 2, a section on the line 2—2 of Fig. 1; Fig. 3, a section on the line 3—3 of Fig. 2; Fig. 4, a section on the line 4—4 of Fig. 1; Fig. 5, a front view of a fragment of the cutter head; Fig. 6, a section on the line 6—6 of Fig. 5; Fig. 7, a detail perspective view of one of the feed screw bearings, and Fig. 8, a detail perspective view of one of the cutter feed screws.

Referring to the drawings the invention is shown as comprising a pipe supporting element A and a pipe cutting mechanism B.

The pipe supporting element A is shown as comprising a table which includes legs 10 and 11 and a top member 12 connecting the upper ends of said legs. The top member 12 is provided with a transverse groove 13 the ends of which are closed by plates 14 provided with suitable bearing openings 15 disposed in alinement with each other. Slidably mounted in the groove 13 are the lower ends of coöperating pipe holding jaws 16 and 17, said lower ends of the jaws 16 and 17 being of a shape corresponding to the groove 13. The lower ends of these jaws 16 and 17 are provided with threaded passages 18 and 19 respectively disposed in alinement with each other and extending in the same direction as the groove 13, the threads of the passage 18 being right hand threads, while those of the passage 19 are left hand threads. Rotatably mounted in the openings 15 of the plates 14 are the ends of a screw 20, one portion of said screw being threaded on so as to correspond with the threads of the passage 18, while the other portion of said screw is threaded to correspond with the threads of the passage 19. Mounted on the end of the screw 20 exteriorly of and adjacent one of the plates 14 is a head 21 in which is slidably mounted an operating handle 22. By this construction it will be apparent that upon rotating the shaft 20 in one direction through the medium of the handle 22 the jaws 16 and 17 will be moved toward each other and into clamping relation with respect to a pipe disposed between said jaws, while the reverse rotation of the shaft 20 will move the jaws 16 and 17 away from each other to release a pipe clamped therebetween. Projecting laterally from the lower ends of the legs 10 and 11 parallel to the longitudinal axis of the machine are guide extensions 23. The inner faces of which are provided with longitudinal grooves 24. The purpose of these guide extensions 23 will be presently apparent.

The pipe cutting mechanism B is shown as comprising a ring formed of semi-circular sections 25 and 26 suitably bolted together at their meeting ends as at 27. Depending from the sections 25 and 26 at corresponding points are legs 28 and 29 respectively each of which provided with a lateral extension 30 projecting respectively into the grooves 24 whereby the cutting mechanism is slidably supported by the guide extensions 23 for movement toward and away from the pipe holding element A. The inner sides of the sections 25 and 26 are convexed as at 31 and provided at intervals with recesses 32 in which the latter are disposed ball bearings 33. Disposed within the ring formed by the sections 25 and 26 is a circular head 34 the periphery of which is concaved as at 35 to receive the convex inner sides of the ring sections 34 and bearing upon the balls 33 so that said head may be rotated within the ring formed by the sections 25 and 26 with the application of very little power. The head 34 is provided centrally with a major opening 36 and the wall of this opening 36 is provided with a plurality of recesses 37 disposed radially with respect to the head 34. Mounted in each of the recesses 37 adjacent the inner end of the latter is a bearing plate 38 provided with a central opening 39. Extending through the opening 39 of each bearing plate is a cutter feed screw 40 the outer end of which is rotatably supported in a socket 41 formed in the inner wall of the recess 37. Fixed upon the screw 40 between the plate 39 and the inner end of the recess 37 is a pinion 42 for a purpose that will presently appear. The side walls of each recess 37 outwardly of the plate 38 are provided respectively with grooves 43 in which is slidably mounted a cutter carrier 44. The inner end of this carrier 44 is provided with a threaded recess 45 in which is engaged the adjacent screw 40. The outer end of the carrier 44 terminates in spaced ears 46 between which is rotatably mounted a disk cutter 47. By this construction it will be apparent that upon the rotation of one of the screws 40 in one direction its associated carrier 44 will be moved toward the center of the head 34, while the reverse rotation of said screw will move the carrier away from the center of the head 34. Mounted upon the ring section 25 is a plate 48 provided with an extension 49 which overlies the head 34. The free end of this extension 49 is enlarged as at 50 and provided at its under side with rack teeth 51 adapted to operatively engage the pinion 42 as the head 34 is rotated and in this manner automatically feed the carriers 44 toward the center of the head 34 during the rotation of the latter. Projecting from the head 34 at suitable intervals are handles 52 through the medium of which the head may be conveniently rotated.

In the use of the machine the pipe to be cut is secured between the jaws 16 and 17 in the manner heretofore referred to and the head 34 of the cutting mechanism is then rotated in the proper direction to move the carriers 44 away from the center of the head by the coöperation between the pinion 42 and the rack teeth 51. When the carriers 44 have moved the required distance from the center of the head 34 the cutting mechanism is adjusted toward the pipe holding element so as to dispose the pipe to be cut between the cutting disks 47. The head 34 is then rotated so as to feed the carriers 44 toward the center of the head 34 and during this operation the cutters 47 will sever the pipe as will be obvious.

What I claim is:—

In a pipe cutting machine, means for supporting a pipe, pipe cutting means comprising a ring, a circular head rotatably mounted in said ring provided with a central opening and a plurality of radial recesses communicating with said opening, cutter carriers slidably mounted in each recess, bearing plates mounted on the head and spanning said recesses respectively, feed screws rotatably mounted in said bearing plates respectively and having corresponding ends rotatably engaged in sockets formed in the inner wall of said recesses and their other end operatively connected with said carriers whereby the rotation of said screws will move said carriers respectively toward the center of the head, and means for successively rotating said screws to move said carriers toward the center of the head during the rotation of the latter.

In testimony whereof, I affix my signature, in the presence of two witnesses.

GEORGE WALLACE.

Witnesses:
 WILLIAM WALLACE,
 TRUE GILMAN.

---

Copies of this patent may be obtained for five cents each, by addressing the "Commissioner of Patents, Washington, D. C."